United States Patent [19]
Van Ooij et al.

[11] Patent Number: 5,338,620
[45] Date of Patent: Aug. 16, 1994

[54] METAL WIRE WITH A LAYER OF COATING FOR REINFORCING ARTICLES MADE OF ELASTOMERIC MATERIALS, AND ARTICLES MADE OF ELASTOMERIC MATERIALS REINFORCED WITH THE SAID WIRE

[75] Inventors: Wim J. Van Ooij, Farfield, Ohio; Jayaramachandran Giridhar, Namakkal, India

[73] Assignee: Pirelli Coordinamento Pneumatici S.p.A., Milan, Italy

[21] Appl. No.: 942,263

[22] Filed: Sep. 9, 1992

[30] Foreign Application Priority Data

Sep. 9, 1991 [IT] Italy .................. MI91 A 002376

[51] Int. Cl.⁵ ................. B32B 15/06; B60C 9/00
[52] U.S. Cl. ................. 428/625; 428/658; 428/659; 57/902; 152/451; 152/565
[58] Field of Search ............ 428/658, 659, 610, 625, 428/614, 687; 152/451, 565; 57/902

[56] References Cited

U.S. PATENT DOCUMENTS

| | | | |
|---|---|---|---|
| 2,296,838 | 9/1942 | Domm | 428/625 |
| 4,218,517 | 8/1980 | Van Ooij | 152/565 |
| 4,226,918 | 10/1980 | Friend | 152/565 |
| 4,255,496 | 3/1981 | Haemers | 428/677 |
| 4,347,290 | 8/1982 | Haemers | 428/625 |
| 4,446,198 | 5/1984 | Shemenski et al. | 428/625 |
| 4,659,631 | 4/1987 | Kurimoto et al. | 428/659 |
| 4,746,408 | 5/1988 | Hyner et al. | 428/658 |
| 4,828,000 | 5/1989 | Lievens et al. | 152/451 |
| 4,872,932 | 10/1989 | Yoshikawa et al. | 152/565 |
| 4,911,991 | 3/1990 | Van Ooij | 428/658 |
| 4,929,512 | 5/1990 | Nishimura et al. | 428/625 |

FOREIGN PATENT DOCUMENTS

| | | | |
|---|---|---|---|
| 0175632 | 3/1986 | European Pat. Off. | |
| 0179517 | 4/1986 | European Pat. Off. | |
| 0188036 | 7/1986 | European Pat. Off. | |
| 0265993 | 5/1988 | European Pat. Off. | |
| 0283738 | 9/1988 | European Pat. Off. | |
| 2426562 | 12/1979 | France | |
| 59-162292 | 9/1984 | Japan | 428/658 |
| 60-50195 | 3/1985 | Japan | 428/659 |
| 9101389 | 3/1992 | PCT Int'l Appl. | |
| 2039580 | 8/1980 | United Kingdom | |

*Primary Examiner*—John Zimmerman
*Attorney, Agent, or Firm*—Stevens, Davis, Miller & Mosher

[57] ABSTRACT

A metal wire for reinforcing articles made of elastomeric material, especially vehicle tires. The subject wire has a coating formed by two concentric layers of zinc-nickel or zinc-cobalt alloys, the radially inner layer of which has a zinc content greater than 90% while the radially outer layer has a nickel or cobalt content greater than 50%.

13 Claims, 1 Drawing Sheet

METAL WIRE WITH A LAYER OF COATING FOR REINFORCING ARTICLES MADE OF ELASTOMERIC MATERIALS, AND ARTICLES MADE OF ELASTOMERIC MATERIALS REINFORCED WITH THE SAID WIRE

BACKGROUND OF THE INVENTION

The present invention relates to metal wires with a double coating layer, in particular, steel wires for reinforcing articles made of elastomeric material, as well as to articles made of elastomeric material, especially tires for vehicles, reinforced with such wires.

It is known that to protect metal wires incorporated in elastomeric material from corrosion and to obtain good adhesion of such wires to the elastomeric material, the wires are coated with a metal alloy.

An alloy which has been in use for a long time for coating metal wires for reinforcing articles made of elastomeric material is an alloy of copper and zinc and more specifically an alloy containing approximately 60–70% copper and approximately 40–30% zinc.

As is already known, metal wires coated with a layer of alloy as referred to above show deterioration in adhesion to elastomeric material over a period of time and are not satisfactorily protected against corrosion. To overcome both disadvantages, the use of other types of alloy for coating wires has been proposed.

In particular, the use of ternary alloys of brass (Cu-Zn) with added nickel or cobalt or other metals as the third element of the alloy, for forming the coating layer of the wires has been proposed. With alloys of this type, some improvement is obtained in the problems of reducing deterioration in adhesion over a period of time in relation to elastomeric material and protection of the wires against corrosion, but such improvement is not sufficient to achieve a significant improvement of the quality level of articles made of elastomeric material reinforced in this way, especially tires.

A different solution which is satisfactory for both problems is that described in commonly assigned European patent 283,738 (U.S. Pat. No. 4,911,991).

That solution consists in coating the metal wires with two concentric, superimposed layers, both made from alloys selected from a zinc-nickel alloy and a zinc-cobalt alloy, of which the radially inner layer contains zinc in a quantity between 60% and 90% inclusive, while the radially outer layer contains nickel or cobalt in a quantity between 60% and 80% inclusive.

The metal wires in accordance with the above-mentioned European patent, while solving both the problem of achieving their protection against corrosion as well as that of adhesion to elastomeric material with acceptable deterioration over a period of time, still present certain problems for the purposes of their production on an industrial scale.

Such unsatisfactory industrial production occurs during the drawing phase which wires undergo after formation of the coating and consists of excessively frequent breaking of the said wires during wire-drawing, as well as excessive wear on drawplates.

SUMMARY OF THE INVENTION

In accordance with the present invention it has been found that it is possible to produce metal wires for reinforcing articles made of elastomeric materials and to produce articles made of elastomeric materials reinforced with the said wires which preserve the good properties of satisfactory adhesion over a period of time to elastomeric material and the resistance to corrosion of metal wires which have already been satisfactorily achieved in accordance with previously mentioned European patent application 283,738 (U.S. Pat. No. 4,911,991), and that furthermore such wires do not have the disadvantages for wire-drawing as described above, and this is achieved, surprisingly, by adjusting the quantity of nickel or cobalt in the radially inner layer.

In its first aspect the present invention relates to a metal wire, for reinforcing articles made of elastomeric material, which is provided with a coating consisting of two concentric layers placed radially one on top of the other, the layers being made from an alloy selected from a zinc-cobalt alloy and a zinc-nickel alloy, characterized in that the alloy from which the radially inner layer is made has a zinc content greater than 90% and the alloy from which the radially outer layer is made has a nickel or cobalt content greater than 50%.

In a further aspect, the present invention relates to an article in a mix of reticulate elastomeric material, in particular a tire for vehicles, incorporating metal reinforcing wires provided with a coating consisting of two concentric layers placed radially one on top of the other, the layers being made of an alloy selected from a zinc-cobalt alloy and a zinc-nickel alloy, the article being characterized in that the alloy from which the radially inner layer of coating is made has a zinc content greater than 90% and the alloy from which the radially more external layer is made has a nickel or cobalt content greater than 50%.

BRIEF DESCRIPTION OF THE DRAWINGS

The present invention will be better understood from the following description, given by way of examples, of preferred embodiments of the invention in which.

DETAILED DESCRIPTION OF THE PREFERRED EMBODIMENTS

Figure 1:
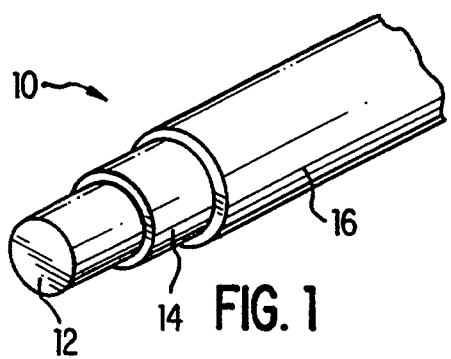
FIG. 1 is a perspective view of a wire made according to the present invention.

Turning first to FIG. 1, it shows a coated metal wire 10 of the invention having a central core which is a bare metal wire 12 such as an ordinary metal wire, in particular made of steel, well known in rubber technology and in particular in the technology of tires. On the surface of this bare wire 12, a first (radially inner) layer of coating 14 is formed from a metal alloy selected from a special zinc-plated cobalt alloy and a special zinc-nickel alloy. The special metal alloys of zinc-cobalt and zinc-nickel suitable for forming the first coating layer of a wire in accordance with the invention have the characteristic that their zinc content is greater than 90%.

If cobalt is present in the metal alloy used to form the first coating layer 14, it is considered that a reduction of the percentage of this element relative to the zinc will favor "drawability" of the wire.

In accordance with the above, the cobalt content should preferably be less than 5% and even more preferably, not greater than 2%.

Forming of the first coating layer 14 of the wire can be achieved by any known method and especially by one of the two methods described in aforementioned U.S. Pat. No. 4,911,991.

For example, with the method of simultaneous deposition of the two metals zinc and nickel by means of a galvanic bath, in which the quantities of the two metals for forming the first coating layer on a wire in accordance with the invention are as previously indicated, the composition of the said bath and the operating methods for the deposition are as follows:

bath temperature between 10° and 30° C. inclusive
pH of the bath between 4 and 8 inclusive
current density (in amperes/dm$^2$) between 5 and 30 inclusive
hexahydrate of nickel sulphate 170 g/l
zinc sulphate 10 g/l
borax 10 g/l
sal ammoniac 14 g/l
lauryl sodium sulphate 1 g/l Still by way of example, if the first coating layer 14 on a wire 12 in accordance with the invention is a zinc-cobalt alloy in the special percentages stated above, the galvanic bath and the operative methods for the same are as follows:

bath temperature 55° C.
pH of the bath 2±0.1
current density (in amperes/dm$^2$) between 60 and 80 inclusive
heptahydrate of cobalt sulphate 120 g/l
heptahydrate of zinc sulphate 620 g/l
sodium sulphate 75 g/l The preferred thickness for the first coating layer 14 during the forming of the coating itself and before the drawing to which the wire with completed coating will be subjected is between 0.25 and 2 microns inclusive.

Checking such thickness is carried out by means of usual quantitative analysis. Each thickness value stated in this text should be checked by such a method.

On top of the first layer 14, a wire in accordance with the invention has a second (radially outer) coating layer 16 formed from an alloy selected from nickel-zinc and cobalt-zinc alloys having the characteristics that their nickel or cobalt content is greater than 50%; the nickel content should preferably be between 70% and 100% inclusive, or alternatively, the cobalt content should be between 70% and 90%.

This second coating layer 16 is also formed in the way indicated by U.S. Pat. No. 4,911,991 by means of simultaneous deposition of the metal components in a galvanic bath.

For example, a galvanic bath for forming the second layer 16 of a wire in accordance with the invention, when the said second layer is an alloy of zinc and nickel in the preferred percentages stated above, the operating conditions of the galvanic bath will be as follows:

bath temperature 60° C.
pH 2.5±0.1
current density (amperes/dm$^2$) between 25 and 35
hexahydrate of nickel sulphate 550 g/l
zinc sulphate 20 g/l
boric acid 35 g/l
sodium sulphate 35 g/l Again as an example, if the second coating layer 16 consists of an alloy of zinc and cobalt in the preferred percentages indicated above, the galvanic bath used will be as follows:

bath temperature 55° C.
pH 2±0.1
current density (amperes/dm2) between 60 and 80 inclusive
zinc sulphate 620 g/l
cobalt sulphate 125 g/l
sodium sulphate 75 g/l The preferred thickness for the second layer 16 during forming of the coating and before the drawing to which the wire with completed coating will be subjected is between 0.25 and 2 microns inclusive.

The total coating thickness on the wire upon leaving the coating bath will therefore be between 0.5 and 4 microns inclusive (for both coatings).

The wire according to the invention, complete with two concentric, superimposed coating layers 14 & 16 having the characteristics stated above is first coated and then undergoes the usual wire-drawing operations by passing it through the usual drawplates in order to reduce its overall external diameter to the customary values making it suitable for use as a reinforcement for articles made of elastomeric material.

Especially for use in the field of vehicle tires, the wire-drawing operations are carried out in successive passes until the initial diameter of the wire (variable between 0.70 and 3.70 ram) is reduced to values between 0.12 mm and 0.30 mm inclusive, enabling values for the first coating layer between 0.15 and 0.40 microns inclusive to be obtained and between 0.05 and 0.20 microns inclusive to be obtained for the second coating layer, the total thickness of the coating finally being between 0.20 and 0.60 microns inclusive.

Figure 3:
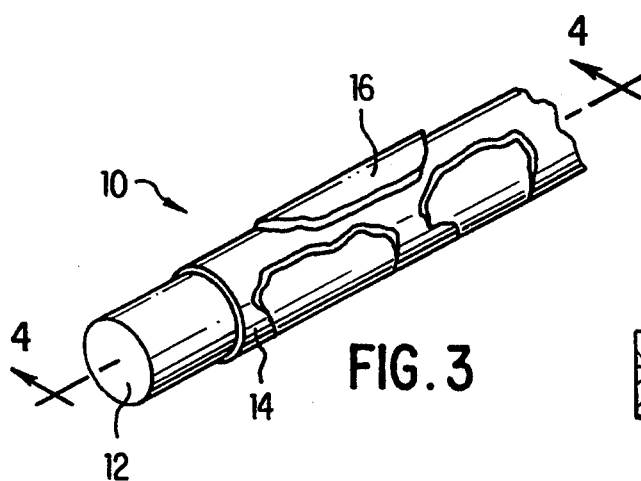
FIG. 3 is a perspective view of a wire such as in claim 1 but after drawing, wherein the raidally outer layer has discontinuous portions.
Figure 4:
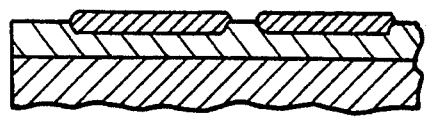
FIG. 4 is a longitudinal sectional view of the wire of FIG. 3 along lines 4—4 thereof.

Here is to be noted that, after the wire drawing steps, due to the very small thickness involved with the coating layers and due to the very strong mechanical stresses acting on the wire during said drawing steps, the radially outer layer may lose its continuity, assuming a particular typical blotchy effect which we may call "leopard skin" appearance as shown in FIGS. 3 and 4.

Stated in other words, the radially outer coating layer 16 may appear to be a plurality of stains, or large spots partially embedded into the radially inner coating layer 14, as illustrated in FIGS. 3 and 4.

Determination on the drawn wire of the existence of the two layers can suitably be carried out by X-ray diffraction techniques and/or by the Auger Electronic Spectroscopy (AES) method.

The wires in accordance with the invention solve the problem described previously, as demonstrated by the experimental tests reported below.

For these experimental tests, three special wires in accordance with the invention are used, indicated in this text as wires A, B, C, and a special, already known wire according to U.S. Pat. No. 4,911,991, indicated in this text as wire N1.

All the special wires mentioned above are made of C 70 steel (an ordinary steel for wires intended for use in the field of tires, having a carbon content up to 0.70%) and have identical dimensions and structure; to be more precise, all the wires, before drawing, have an overall external diameter of 1.40 mm and are provided with a coating formed by two concentric, superimposed layers 14 & 16, each of which has a thickness not greater than 2 microns.

The characteristics of the above-mentioned wires are indicated in Table 1:

TABLE 1

| Wire Name | A | B | C | N1 |
|---|---|---|---|---|
| First layer (inner) | 95% Zn 5% Co | 98% Zn 2% Co | 98% Zn 2% Co | 70% Zn 30% Co |
| Second layer (outer) | 80% Ni 20% Zn | 80% Ni 20% Zn | 90% Ni 10% Zn | 80% Ni 20% Zn |

All the special wires described above have undergone wire-drawing to reduce them to a final diameter of 0.25 mm, to which for the coating layers mean thickness values of 0.35 microns for the radially inner layer and 0.15 microns for the raidally outer layer correspond.

For this purpose, 19 drawplates made of type V 32 tungsten carbide were used, essentially already known, in a bath of a common lubricant (VSV 351/IL oil marketed by Zeller Gmelin), the results obtained being reported in Table 2.

Table 2 gives in particular, mean percentage values of losses in weight of the coating caused by the said wire-drawing, mean percentage values in weight of drawn wire after which it is necessary to change the drawplates, and mean percentage values in weight of wire drawn for each wire breakage, values of 100 having been arbitrarily assigned to the N1 wire for purposes of comparison.

TABLE 2

| Wire Name | A, B, C | N1 |
|---|---|---|
| Loss of coating in weight | 20–30% | minimum of 40% |
| Quantity of wire produced per drawplate | 300 | 100 |
| Quantity of wire produced for each wire breakage | 400 | 100 |

The results of the experimental tests shown in Table 2 clearly demonstrate that with the wires in accordance with the invention, both the problem of reducing wear on the drawplates during wire-drawing carried out after completion of coating the said wires and that of reducing the frequency of breakages of wires during wire-drawing are solved.

Further experimental tests have been carried out on small cords made from already known wires in accordance with U.S. Pat. No. 4,911,991 as well as wires in accordance with the present invention in order to determine the values of adhesion to elastomeric material and deterioration in time of adhesion between the small cords and the elastomeric material.

For these further experimental tests, a mix was used in accordance with the recipe given in Table 3.

TABLE 3

| Components of the Mix | Quantity in Weight |
|---|---|
| Natural rubber | 100 |
| Zinc oxide | 8 |
| 6PPD antiozonant | 2 |
| TMQ antioxidant | 1 |
| Complex cobalt salt (Manobond 680C) | 0.5 |
| HAF lampblack | 50 |
| Accelerator - Santocure MCR | 1 |
| Sulphur | 6 |

Figure 2:
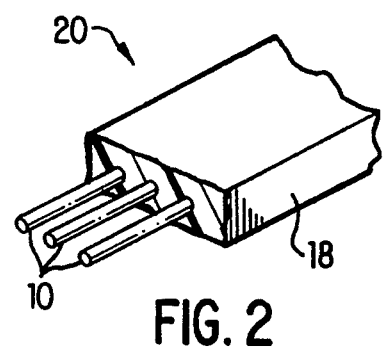
FIG. 2 is a block of elastomer reinforced with wires according to the present invention.

For these latter tests, test pieces were prepared in accordance with ASTM D2229-80, which specifies vulcanization for a period of 30 minutes at 151° C. of small, prismatic blocks of elastomeric material in which small cords have been incorporated (made by combining 5 wires 0.25 mm in diameter) with approximately 12 mm gaps between each other and embedded 12.5 mm deep in elastomeric material 18 as shown in FIG. 2.

The test according to which adhesion of rubber to metal is measured consists of determining the force necessary to draw out the individual cords from the prismatic block 20 containing them and determining the degree of covering with elastomeric material of the cords extracted by force from the block 20.

To measure the deterioration of adhesion, over a period of time, the test is again the one previously described, but the withdrawing test on the cords is carried out after ageing treatment of the test piece consisting of storing it for a pre-fixed period of 4 days in an environment at 65° C. with 90% relative humidity.

With the mix and the small cords described above, the same number of test pieces were prepared as the number of small cords formed from the wires covered with the different types of coatings previously described.

The experimental results obtained are reproduced in Table 4.

TABLE 4

| Test pieces made of mix containing small cords | A, B, C | N1 |
|---|---|---|
| Mean value of force effecting withdrawal of a small cord from a test piece not subjected to ageing | 537 N | 414 N |
| Mean value of force effecting withdrawal of a small cord from a test piece subjected to ageing | 450 N | 350 N |
| Index of cover of small cord extracted from test piece not subjected to ageing | 4 | 4 |
| Index of cover of small cord extracted from test piece subjected to ageing | 3 | 2 |

In this text the numerical values of the cover indices have the following meaning:

Cover index 4 signifies small cord completely covered with elastomeric material;

Cover index 3 signifies small cord ⅔rd covered with elastomeric material;

Covered index 2 signifies small core ⅓rd covered with elastomeric material;

Cover index 1 signifies small cord with no cover of elastomeric material at all

Further experimental tests have been carried out with small cords made from wires in accordance with the invention, incorporated in vulcanized elastomeric material and with small cords made from N2 wires brass-plated with 67.5% copper and 32.5% zinc in order to ascertain the existing differences between the characteristics of adhesion of the cords to the elastomeric material and with regard to the presence of corrosion on the wires forming the cords.

The small cords mentioned above are again small cords of 5×0.25 formation (i.e. consisting of a strand of 5 wires, each 0.25 mm in diameter) and differ from each other only in the different types of wires from which they are made; these cords will therefore be marked in this text with the same index as that used to mark the wires from which they are made.

Figure 5:
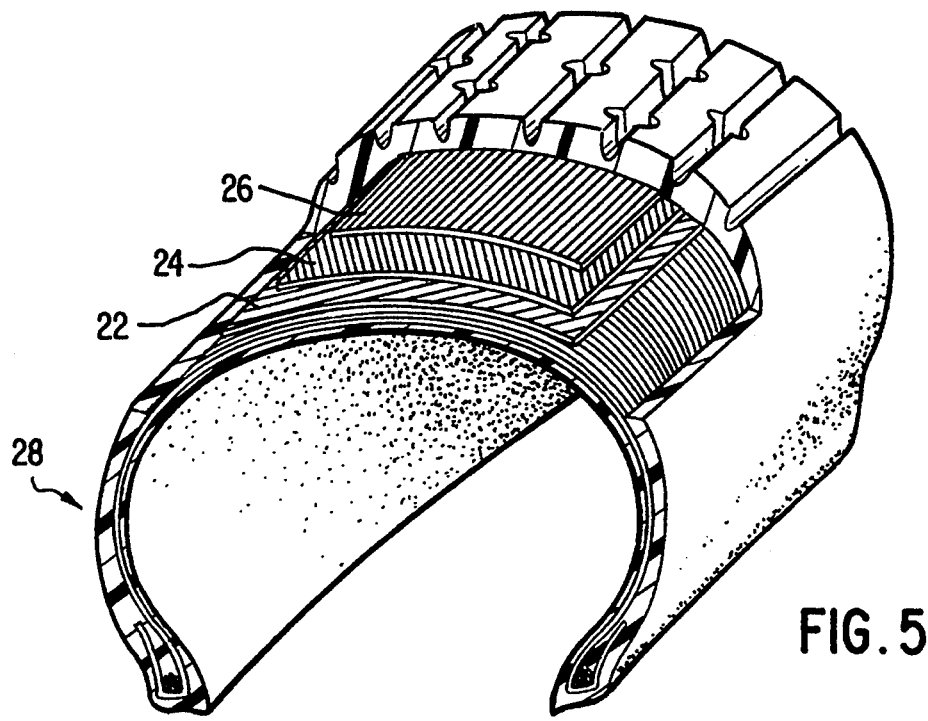
FIG. 5 is a perspective view, partially in section, of a tire including reinforcement wires according to the invention.

Referring now to FIG. 5, a size 165 R 13 tire 28 with a P4 tread pattern, was made using the mix described above to form circumferentially extending reinforced breaker layers 22 and 24, as well as small cords A, B, C in accordance with the invention, and the small, brass-plated cord N2 indicated above.

Sample cross sections 20 cm wide in circumferential length were cut from the tires and subjected to ageing treatment in a saline mist chamber.

The treatment conditions to which the test pieces were subjected are as follows:
- exposure times . . . 20 and 40 days
- saline solution . . . 5% aqueous solution of sodium chloride
- mist density . . . 1.5 cc/h on an area 80 cm$^2$
- chamber internal temperature . . . 45° C.

After ageing in this way, the sections were treated by removing the elastomeric material forming the tread in order to recover the layer of breaker structure containing the small cords (the subject of the investigation) and hence to note the adhesion characteristics of the small cords to the elastomeric material in which they were incorporated and the presence of corrosion in the wires forming the small cords.

Similar data was recorded on sections not subjected to ageing in the saline mist chamber, i.e. taken from vulcanized tires as such.

Determination of adhesion values was carried out by tearing three small cords off the strips of breaker fabric 22-26, each cord separated from the adjacent strips by one small cord, keeping the tear-off angle constantly at 90 degrees.

The data recorded are reproduced Table 5.

TABLE 5

|  | adhesion | degree of cover | traces of corrosion |
|---|---|---|---|
| Tires with breaker with cords A, B, C not treated in saline mist chamber | 11 N | 4 | no |
| Tires with breaker with cords A, B, C, treated for 20 days in saline mist chamber | 9 N | 4 | no |
| Tires with breaker with cords A, B, C, treated for 40 days in saline mist chamber | 6 N | 3 | no |
| Tires with breaker with N2 cords not treated in saline mist chamber | 8 N | 4 | no |
| Tires with breaker with N2 cords treated for 20 days in saline mist chamber | 6 N | 3 | no |
| Tires with breaker with N2 cords treated for 40 days in saline mist chamber | 3 N | 1 | traces |

The differences between the adhesion values reported above for the withdrawal tests from the block (ASTM D2229-80) and those just reported for the tear-off test from the strip of breaker fabric are due to the different types of tests carried out.

In any case, from all the test results, the small cords made from wires in accordance with the present invention, after incorporation in elastomeric material, show better adhesion results and better resistance to corrosion than those shown by the small cords made from brass-plated wires.

I claim:

1. A metal wire for reinforcement of articles made of elastomeric material, provided with a coating which comprises two concentric layers arranged radially one on top of the other, said layers made of an alloy selected from the group consisting of a zinc-cobalt alloy and zinc-nickel alloy, the alloy from which the radially inner layer of the coating is made is a zinc-cobalt alloy and it has a zinc content of from 95% to 98% and a cobalt content of less than 5% and the alloy from which the radially outer layer of the coating is made has a nickel or cobalt content of from 50% to 90%.

2. A metal wire in accordance with claim 1 in which the radially outer layer of the coating is made from a zinc-nickel alloy with a nickel content of from 70% to 90%.

3. A metal wire in accordance with claim 2 in which in the radially inner layer of the coating the cobalt content is not greater than 2%.

4. A metal wire in accordance with claim 1 in which the radially outer layer of the coating is made from a zinc-cobalt alloy with a cobalt content of from 70% to 90%.

5. A metal wire in accordance with claim 1 in which the radial outer coating is discontinuous over at least a portion of the length of the wire.

6. An article of a reticulate elastomeric material mix incorporating metal reinforcing wires provided with a coating which comprises two concentric layers placed radially one on top of tile other, said layers made of an alloy selected from the group consisting of a zinc-cobalt alloy and a zinc-nickel alloy, the alloy from which tile radially inner layer of the coating is made is a zinc-cobalt alloy and it has a zinc content of from 95% to 98% and a cobalt content of less than 5% and the alloy from which the radially outer layer of tile coating is made has a nickel or cobalt content of from 50% to 90%.

7. An article in accordance with claim 6 in which the radially outer layer of the coating of the said wires is made of a zinc-nickel alloy with a nickel content of from 70% to 90%.

8. An article in accordance with claim 6 in which the radially outer layer of the coating of the wires is made from a zinc-cobalt alloy with a cobalt content of from 70% to 90%.

9. An article in accordance with claim 6 in which said radially outer layer is discontinuous over at least a portion of the length of the wire.

10. A motor vehicle tire incorporating metal reinforcing wires provided with a coating which comprises two concentric layers placed radially one on top of the other, said layers made of an alloy selected from the group consisting of a zinc-cobalt alloy and a zinc and nickel alloy, the alloy from which the radially inner layer of the coating is made is a zinc-cobalt alloy, has a zinc content of from 95% to 98% and has a cobalt content of less than 5% and the alloy from which the radially outer layer of the coating is made has a nickel or cobalt content of from 50% to 90%.

11. A tire in accordance with claim 10 in which the radially outer layer of the coating of the said wires is made from a zinc-nickel alloy with a nickel content of from 70% to 90%.

12. A tire in accordance with claim 10 in which the radially outer layer of the coating of the said wires is made from a zinc-cobalt alloy with a cobalt content of from 70% to 90%.

13. A tire in accordance with claim 10 in which said radially outer layer is discontinuous over least a portion of the length of the wire.

* * * * *